UNITED STATES PATENT OFFICE.

JAMES R. ROSE, OF EDGEWORTH, PENNSYLVANIA, AND JOHN HARRIS, OF LAKEWOOD, OHIO, ASSIGNORS TO CARBO-OXYGEN COMPANY. OF PITTSBURGH, PENNSYLVANIA, A CORPORATION OF DELAWARE.

GASEOUS FUEL.

1,404,220.     Specification of Letters Patent.     Patented Jan. 24, 1922.

No Drawing.     Application filed December 26, 1919. Serial No. 347,447.

*To all whom it may concern:*

Be it known that we, (1) JAMES R. ROSE, (2) JOHN HARRIS, citizens of the United States, residing at (1) Edgeworth, (2) Lakewood, in the county of (1) Allegheny, (2) Cuyahoga, and State of (1) Pennsylvania, (2) Ohio, have invented a certain new and useful Improvement in Gaseous Fuel, of which the following is a full, clear, and exact description.

This invention relates to gaseous fuel which is particularly useful for the purpose of producing a concentrated flame having a high temperature and capable of doing extremely fine work in the cutting of metals. A flame of this character is requisite for use in blowpipes with carbographs and for the cutting of steel such as is used in die work and for the trimming of the edges of armor plate as at present constituted.

We obtain a gas having the above desirable characteristics by mixing with hydrogen, as a combustible base, carbon monoxide and illuminating gas in the proportions of from $2\tfrac{1}{2}\%$ to $12\tfrac{1}{2}\%$ by volume each of such carbon monoxide and illuminating gas to the hydrogen constituent. The carbon monoxide has a flame temperature above that of hydrogen and the illuminating gas a flame temperature approximately the same as that of hydrogen, and the temperature produced by the combustion of the combined or mixed gases is above 3200° C. The illuminating gas is readily obtainable in many municipalities. The gaseous mixture produces within the burning hydrogen a visible cone which enables the operator to adjust the proportions of the gases and of the combustion-supporting oxygen as may be necessary, as well as to apply the flame in the most advantageous manner to the work. Both the volume of the flame and the heat units produced by the combustion of the mixture are greater than are produced by the combustion of hydrogen alone; and, as pointed out, the gaseous mixture is particularly well adapted for the cutting of metal with a minimum of slagging and with an extremely narrow slot, which results in the fineness of cutting referred to hereinbefore.

The following is an analysis of a typical illuminating gas such as has proven advantageous in admixture with carbon monoxide and hydrogen:

| | |
|---|---:|
| $CO_2$ | 1.6 |
| Illuminants | 4.0 |
| Oxygen | 0.4 |
| CO | 8.5 |
| Hydrogen | 49.8 |
| $CH_4$ | 29.8 |
| Nitrogen | 3.2 |
| $C_2H_6$ | 3.2 |
| B. T. U. | 622 |
| Cu. ft. of oxygen required for combustion of a cu. ft. of gas | 1.09 |

According to Richards on Metallurgical Calculations, published in 1908, and with the illuminating gas of approximately the analysis above set forth, the flame temperature produced by the combustion of the above described gaseous mixture will be above 3200° C., and the variations in the percentages of the said gases will cause approximately the following variations in the net B. T. U. per cubic foot of mixture and in the cubic feet of oxygen required for the combustion of a cubic foot of such mixture;

No. 1 mixture, 95% H. with $2\tfrac{1}{2}\%$ each of carbon monoxide and illuminating gas; Net B. T. U.'s 302; cu. ft. of oxygen .527.

No. 2 mixture, 75% H. with $12\tfrac{1}{2}\%$ each of carbon monoxide and illuminating gas; net B. T. U.'s 335; cu. ft. of oxygen .637.

Having thus described our invention, what we claim is:

1. A gas for cutting, welding and heating purposes consisting of a mixture of illuminating gas and carbon monoxide with hydrogen in the proportions of from $2\tfrac{1}{2}\%$ to $12\tfrac{1}{2}\%$ by volume each of illuminating gas and carbon monoxide to hydrogen.

2. A gas for cutting, welding and heating purposes consisting of a mixture of illuminating gas and carbon monoxide with hydrogen in proportions not substantially less than 5% by volume of such combined gases to the hydrogen and not materially more than 25% of such combined gases to the hydrogen, the illuminating gas and carbon monoxide being present in the proportions of at least $2\tfrac{1}{2}\%$ each in such mixture.

In testimony whereof, we hereunto affix our signatures.

JAMES R. ROSE.
JOHN HARRIS.